Patented Aug. 25, 1931

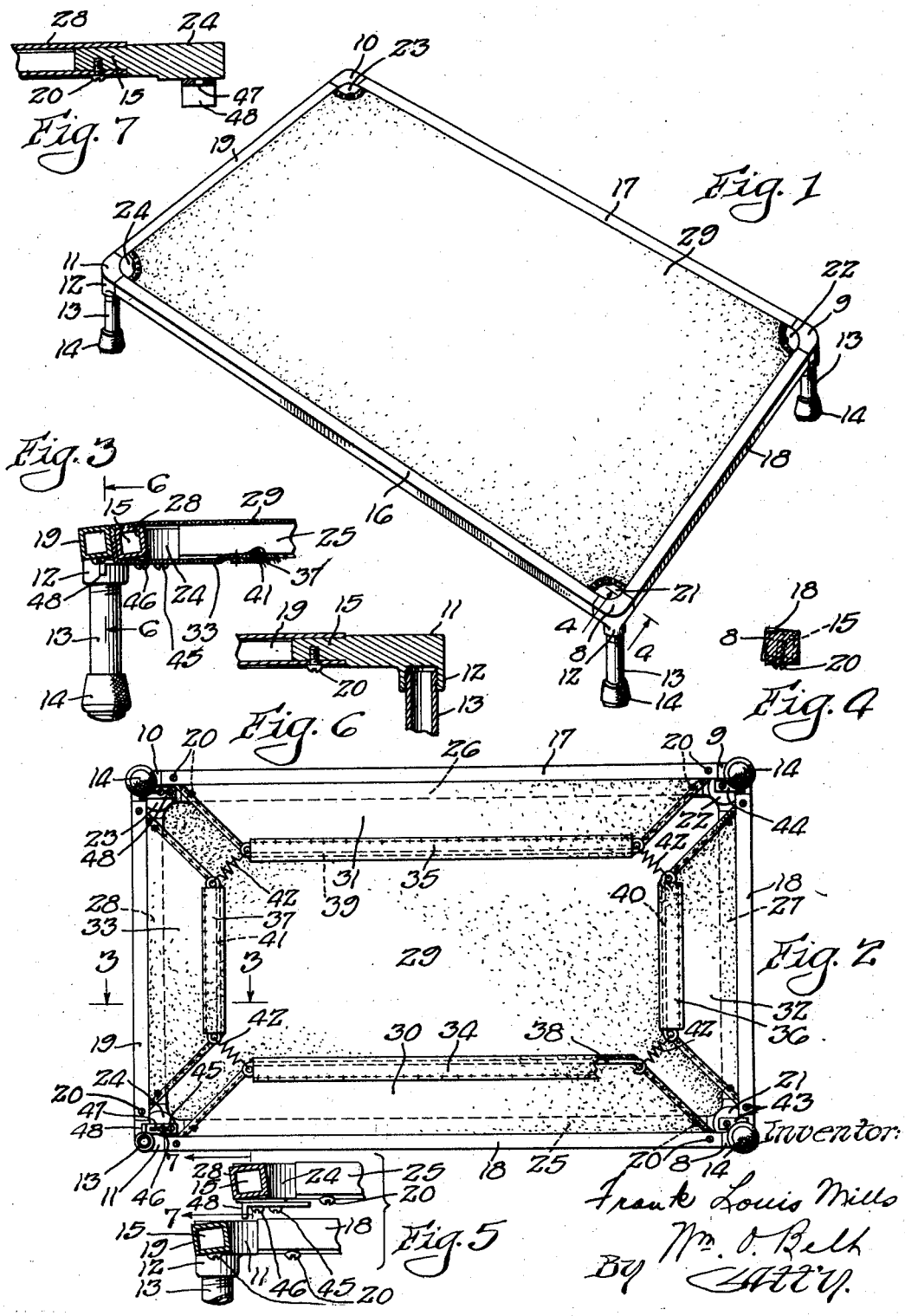

1,820,284

UNITED STATES PATENT OFFICE

FRANK LOUIS MILLS, OF CHICAGO, ILLINOIS

ANIMAL BED

Application filed May 5, 1930. Serial No. 449,726.

This invention relates to beds for dogs, cats, and other animals, and the salient object is to provide a strong and substantial yet sufficiently yieldable structure to provide a comfortable bed for the animal.

Other objects of the invention are to provide a bed which will embody a portion which may be removed to facilitate cleaning thereof; to provide a bed in which the yieldable portion will be held against undue stretching; and to provide a structure which may be economically manufactured.

A selected embodiment of the invention is illustrated in the accompanying drawings and, therein, Fig. 1 is a perspective view of an animal bed constructed in accordance with my invention;

Fig. 2 is a bottom plan view of the bed illustrated in Fig. 1;

Fig. 3 is a sectional view taken substantially on the line 3—3 of Fig. 2;

Fig. 4 is a sectional view taken substantially on the line 4—4 of Fig. 1;

Fig. 5 is a sectional detail view illustrating portions of the inner and outer frames of the bed;

Fig. 6 is a sectional view taken substantially on the line 6—6 of Fig. 3; and

Fig. 7 is a sectional view taken substantially on the line 7—7 of Fig. 5.

In the drawings, 8, 9, 10 and 11, indicate the corner members of the outer frame of my improved bed. Depending from each of these corner portions is a boss, such as 12, in which the legs 13 are screw-threadedly mounted, as illustrated in Fig. 6. At the lower ends of the legs 13 I provide resilient pads 14 which provide suitable feet for the bed. Each of the corner portions includes sections which extend at right angles to each other, and these sections terminate in reduced portions indicated by 15. These portions 15 preferably have the upper and lower faces thereof inclined from the horizontal, and since these portions are rectangular in formation the side faces thereof will be inclined from the vertical. The side bars 16 and 17 and the end bars 18 and 19 have the end portions 15 of the respective corner portions inserted therein and these portions 15 are connected to these side and end bars by suitable screws such as 20. It is, therefore, apparent that a substantially rectangular frame will be provided and, by reason of the angular inclination of the portions 15 to which the side and end bars forming the frame are conncected, it is manifest that the inwardly directed faces of the frame will be inclined from the vertical. An inner frame is provided which includes corner portions 21, 22, 23, and 24, and these corner portions are similar to the corner portions 8, 9, 10, and 11, with the exception that the depending bosses 12 are omitted. Since these corner portions are all substantially similar they may be formed from the same pattern, and this pattern will preferably be constructed to embody a removable portion which will provide the boss 12 on the desired ones of the corner portions. Side bars 25 and 26 and end bars 27 and 28 are extended between the end portions 15 of the corner portions 21, 22, 23, and 24. The side bars 25 and 26 are shorter than the side bars 17 and 18, and the end bars 28 and 29 are shorter than the end bars 18 and 19, and this difference in length is sufficient to permit the frame provided by the shorter bars to be fitted within the frame provided by the longer bars. The side faces of the end bars of the inner frame are inclined from the vertical in the same amount as the inclination of the faces of the bars of the outer frame. It is, therefore, apparent that when the inner frame is fitted within the outer frame these inclined faces will cooperate, and when pressure is applied a wedging action will result. The covering of the bed is indicated by 29 and is preferably made from canvas or other textile material. This covering 29 includes side flaps 30 and 31 and end flaps 32 and 33. These flaps are defined by cutting away the corner portions of the covering 29 and, in this manner, clearance is provided for the corner portions of the inner frame. The ends of the side flaps 30 and 31 are hemmed, as indicated at 34 and 35, and the ends of the end flaps 32 and 33 are hemmed, as indicated at 36 and 37. The ends of these hems are open. A rod 38 is passed through the hem 34 and at the ends of this rod are hook elements. Similar rods 39, 40 and 41 are passed through the hems 35, 36 and 37, respectively. Extended between the hook portions, at adjacent ends of the rods, are springs 42. It is, therefore, apparent that when the covering 29 is fitted over the inner frame and the rods are installed in position with the springs interconnected therebetween the covering will be maintained in taut condition. The inner frame with the covering thereon is disposed in the outer frame. When the animal rests upon the bed pressure will be exerted on the covering 29 and, since this covering is carried by the inner frame, pressure will be exerted on this inner frame. This pressure will be in a downward direction and, therefore, a wedging action between the inclined faces of the inner and outer frames will occur. Since the covering 29 will be disposed between these inclined faces the resulting wedging action will serve to prevent stretching of the covering 29 which would normally expand when pressure was exerted on the covering 29. However, by reason of the wedging action, undue stretching of the covering 29 will be prevented, and, therefore, this covering will be maintained in a relatively taut condition even though undue stress is exerted on the covering 29. It is apparent that inclined bars will cooperate to prevent the inner frame from passing through the outer frame in a downward direction. However, in order to prevent displacement of the inner frame from the outer frame in an upward direction, some additional means should be provided. To attain this, I connect outwardly extending lugs 43 and 44 to the corner portions 21 and 22, respectively, and when the inner frame is inserted in the outer frame these lugs project below the outer frame. On the corner portions 23 and 24, respectively, I provide alined screws 45 and 46 which screws extend through slots 47 in the slidable lugs 48. These slidable lugs may be moved inwardly so as not to project beyond the inner frame and when so disposed the inner frame may be arranged in the outer frame. After the inner frame is arranged in the outer frame these lugs are moved to project below the outer frame and, therefore, displacement of the inner frame is prevented.

While I have illustrated and described the preferred form of construction for carrying my invention into effect, it is to be understood that this is capable of variation and modification without departing from the purview of the invention as set forth in the following claims:

I claim:

1. An animal bed comprising an outer frame embodying tapered portions, an inner frame embodying cooperatingly tapered inner portions, a section of covering material stretched over said inner frame, means for maintaining said section of covering material in taut condition, sections of said covering material being interposed between the tapered portions of said frames when said inner frame is arranged in said outer frame whereby pressure exerted thereon will cause a wedging action to prevent undue stretching of said section of covering material.

2. An animal bed comprising an outer frame embodying side bars, end bars, and corner portions having inclined walls for interconnecting said side and end bars whereby said bars will be similarly inclined, and an inner frame including side bars, end bars, and corner portions having inclined walls for interconnecting said side and end bars whereby said bars will be similarly inclined, and a section of covering material stretched over said inner frame and directed thereabout whereby portions of said section of material will be interposed between the inclined bars of the inner frame and the inclined bars of the outer frame when said inner frame is arranged in said outer frame.

3. An animal bed comprising an outer frame embodying side bars, end bars, and corner portions having inclined walls for interconnecting said side and end bars whereby said bars will be similarly inclined, and an inner frame including side bars, end bars, and corner portions having inclined walls for interconnecting said side and end bars whereby said bars will be similarly inclined, a section of covering material stretched over said inner frame and directed thereabout whereby portions of said section of material will be interposed between the inclined bars of the inner frame and the inclined bars of the outer frame when said inner frame is arranged in said outer frame, and means for retaining said inner frame in said outer frame.

FRANK LOUIS MILLS.